(No Model.)

F. A. HUNTINGTON.
ORE CAR.

No. 487,572. Patented Dec. 6, 1892.

Witnesses:

Inventor,
Frank A. Huntington
By Dewey & Co.
Atty

UNITED STATES PATENT OFFICE.

FRANK A. HUNTINGTON, OF SAN FRANCISCO, CALIFORNIA.

ORE-CAR.

SPECIFICATION forming part of Letters Patent No. 487,572, dated December 6, 1892.

Application filed January 5, 1892. Serial No. 417,082. (No model.)

*To all whom it may concern:*

Be it known that I, FRANK A. HUNTINGTON, a citizen of the United States, residing in the city and county of San Francisco, State of California, have invented an Improvement in Ore and other Load Cars; and I hereby declare the following to be a full, clear, and exact description of the same.

My invention relates to the general class of wheeled vehicles for carrying loads, and especially to the class of cars designed for carrying ore.

It consists, in connection with the frame of the car, of a wheeled axle pivoted thereto in such a manner as to have a tilting or rocking action in the direction of its length; and it also consists in the novel construction of this pivot connection, as I shall hereinafter fully describe, and specifically point out in the claims.

The object of my invention is to make the car stand and travel on all its wheels, irrespective of the unevenness of the track, due to obstacles thereon or other causes. In moving these cars obstacles—such as hard lumps of ore, rocks, coal, or other pieces—are all the time encountered by the car-wheel. In riding over them the ordinary car is so tilted that it rests and travels on two wheels, making it harder to move and unsteady in its position; but by my construction the car will stand squarely and will travel fully on all its wheels no matter in what position it may be or what obstacles it may encounter, and thus the load will be equalized.

Figure 1:
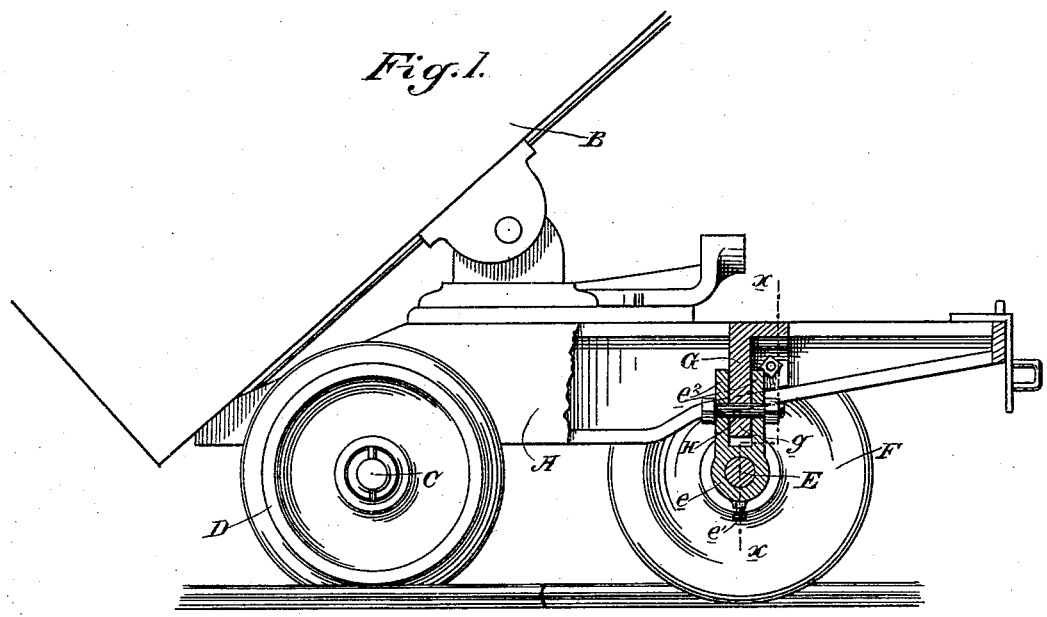
Figure 2:
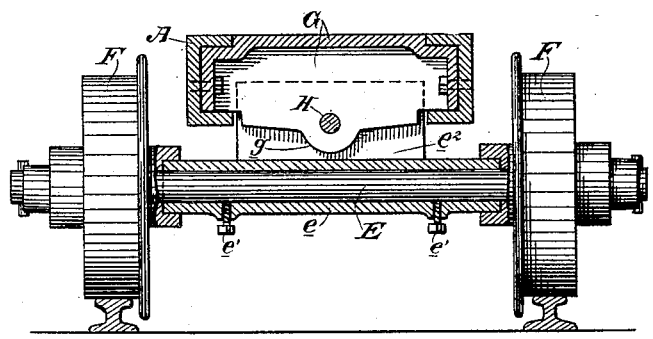

Referring to the accompanying drawings for a more complete explanation of my invention, Figure 1 is a part side elevation of my ore-car and part section. Fig. 2 is a cross-section of the frame in the longitudinal plane of the front axle.

A is the frame, and B is the body, of an ordinary ore-car. The body is mounted on the frame and is adapted to be manipulated in the usual manner.

C is one of the axles, having wheels D. This axle is secured solidly to frame A in the ordinary manner.

E is the other axle, having wheels F. This axle is connected with frame A by a pivotal joint arranged in such a manner that it can tilt or rock in the direction of its length. This joint may be of any suitable character necessary to effect or allow this tilting or rocking action. The result is that no matter how uneven the surface may be on which the car is standing or traveling it will rest or travel squarely on all four wheels, and can be easily moved and manipulated, and the load will always be equalized.

The construction of pivotal joint which I prefer is as follows: The axle E has a sleeve $e$ secured to it by set-screws $e'$. This sleeve is formed with longitudinal spaced or separated flanges $e^2$. To the sides of frame A is bolted a cross-plate G, which lies between the separated flanges $e^2$ of sleeve $e$ and is formed with a rounded bottom bearing $g$, which bears on the sleeve, as shown. A pivot-bolt H passes through the flanges $e^2$ and intervening plate, and about this bolt the axle E tilts or rocks longitudinally.

Having thus described my invention, what I claim as new, and desire to secure by Letters Patent, is—

1. In an ore or other load car, the frame and the wheeled axle E, in combination with the pivotal connection between said frame and axle, consisting of the sleeve on the axle, having the spaced flanges, the cross-plate secured to the frame and seated between the spaced flanges, and the horizontal pivot-bolt passing through the flanges and intervening plate, substantially as herein described.

2. In an ore or other load car, the frame and the wheeled axle E, in combination with the pivotal connection between said frame and axle, consisting of the sleeve on the axle, having the spaced flanges, the cross-plate secured to the frame and seated between the spaced flanges of the sleeve, said cross-plate having a rounded bottom bearing resting on the sleeve, and the horizontal pivot-bolt passing through the flanges and intervening plate, substantially as herein described.

In witness whereof I have hereunto set my hand.

FRANK A. HUNTINGTON.

Witnesses:
S. H. NOURSE,
J. A. BAYLESS.